United States Patent [19]

Gaskell et al.

[11] Patent Number: 4,562,489
[45] Date of Patent: Dec. 31, 1985

[54] APPARATUS FOR RECORDING OF DIGITAL DATA

[75] Inventors: Philip S. Gaskell, London, England; Roger Lagadec, Rumlang, Switzerland; Guy W. McNally, Shere, England

[73] Assignee: Willi Studer AG, Regensdorf, Switzerland

[21] Appl. No.: 644,182

[22] Filed: Aug. 24, 1984

[30] Foreign Application Priority Data

Aug. 26, 1983 [GB] United Kingdom ............. 8323112

[51] Int. Cl.$^4$ ............................ G11B 5/09; G11B 5/02
[52] U.S. Cl. ............................................. 360/39; 360/27
[58] Field of Search ....................... 360/27, 28, 39, 48

[56] References Cited

U.S. PATENT DOCUMENTS 3,765,005 10/1973 Cannon .............................. 360/48

FOREIGN PATENT DOCUMENTS

| 0044713 | 1/1982 | European Pat. Off. | ............ 360/14.1 |
| 0074841 | 3/1983 | European Pat. Off. | ............... 360/32 |
| 2734432 | 2/1979 | Fed. Rep. of Germany | ........ 360/32 |
| 2907834 | 9/1980 | Fed. Rep. of Germany | ........ 360/32 |
| 2458874 | 12/1981 | France | .................................. 360/39 |
| 1479861 | 7/1977 | United Kingdom | ................... 360/31 |
| 2052830 | 1/1981 | United Kingdom | ................... 360/32 |
| 2080997 | 2/1982 | United Kingdom | ................... 360/32 |
| 2081957 | 2/1982 | United Kingdom | ................... 360/32 |

OTHER PUBLICATIONS

"An Experimental Digital Videotape Recorder", by K. Yokoyama et al, The BKSTS Journal, 11/80.

Primary Examiner—Vincent P. Canney
Attorney, Agent, or Firm—Robert F. O'Connell

[57] ABSTRACT

A multitrack tape recorder records and replays digital data on a plurality of data tracks (15) by way of record-/replay electronics (7), a record head (5) and a replay head (6). Channels (8) corresponding to the tape track (15) are provided for input to and output from the electronics (7). An additional channel (11) carries auxiliary data related to the signals in the channels (8). This data is formatted during recording by the electronics (7) into a block format compatible with the data format on channels (15) and is recorded on a separate dedicated track (16). The auxiliary information may be formatted in labels each of which has an instruction field and a parameter field. The labels can carry a wide variety of information relating to operation of the system. As one example, a label may contain in the instruction field an instruction to increase the playback gain by an amount contained in the parameter field.

29 Claims, 4 Drawing Figures

APPARATUS FOR RECORDING OF DIGITAL DATA

FIELD OF THE INVENTION

This invention relates to an apparatus for recording of digital data corresponding to signals transmitted through an input data channel and to be recorded on a corresponding track on a recording medium.

PRIOR ART

In transmission of digital data, especially of digital audio data, it is often desirable for additional information to accompany the digital data transmitted. Such a proposal for information which accompanies digital audio data on a transmission path is made in an European Broadcasting Union draft recommendation CT/III-B, "A digital audio interface for professional audio applications".

Until now, it has not been possible to record such additional information because available recorders are not equipped to handle it. In the case of recorders for digital audio signals, small amounts of additional information related to the individual tracks or channels and supplementing the digital audio signals are employed (GB No. 2 080 997). Such information may relate to the possible use of preemphasis but provides auxiliary information relating only to the whole tape, i.e. the additional information is confined to a preamble. The additional track (CTL track) for this data also carries regular position addresses.

OBJECT OF INVENTION

The object of the present invention as defined in the claims is therefore to provide an apparatus for recording of auxiliary digital data capable of handling additional information related to the primary digital data transmitted through the input channel and which additional information can be edited so as to control editing conditions for the primary digital data itself.

INVENTION

According to the present invention there is provided apparatus for recording digital primary data corresponding to signals transmitted through one or more input data channels and recorded on one or more tracks on a recording medium, characterised by means responsive to auxiliary data attached to said primary data, said auxiliary data consisting of control instructions and information related to the said digital primary data, said means carrying out record/reading operations of said auxiliary data on at least one separate track on the recording medium and executing instructions acting upon said digital primary data and said means establishing a formatted structure for the auxiliary data related to the structure of the digital primary data corresponding to the signals.

OPERATION

Because the auxiliary data is in formatted labels it is possible to edit this data and provide "intelligent" data referring to high-level applications rather than to the simple act of recording a signal in a particular way. Labels can in particular be written, edited, modified, moved, erased, read and executed independently of the already recorded digital audio signals, whereas the data entering the CTL track are predetermined at the instant of recording and may not be modified without making it impossible to read the digital audio data correctly.

In the case of Labels, it is possible, for example, to first make a recording, then at a later stage to write copyright information, editing marks, gain changes etc. Labels are freely selectable additional information referring to applications such as processing, protection etc of an audio signal being recorded or already recorded. Implementation of the invention is made possible by a recorder with a set of heads and processing circuitry making it possible to handle the additional data, without changing the digital audio signals to which they refer. The additional information makes it possible to greatly increase the flexibility and economy of operation of recorders, as a great quantity of data which could otherwise be lost or forgotten now always accompanies the digital audio signals.

DRAWINGS

The invention will be described in more detail, by way of example, with reference to the accompanying drawings, in which.

EMBODIMENT

Figure 1:
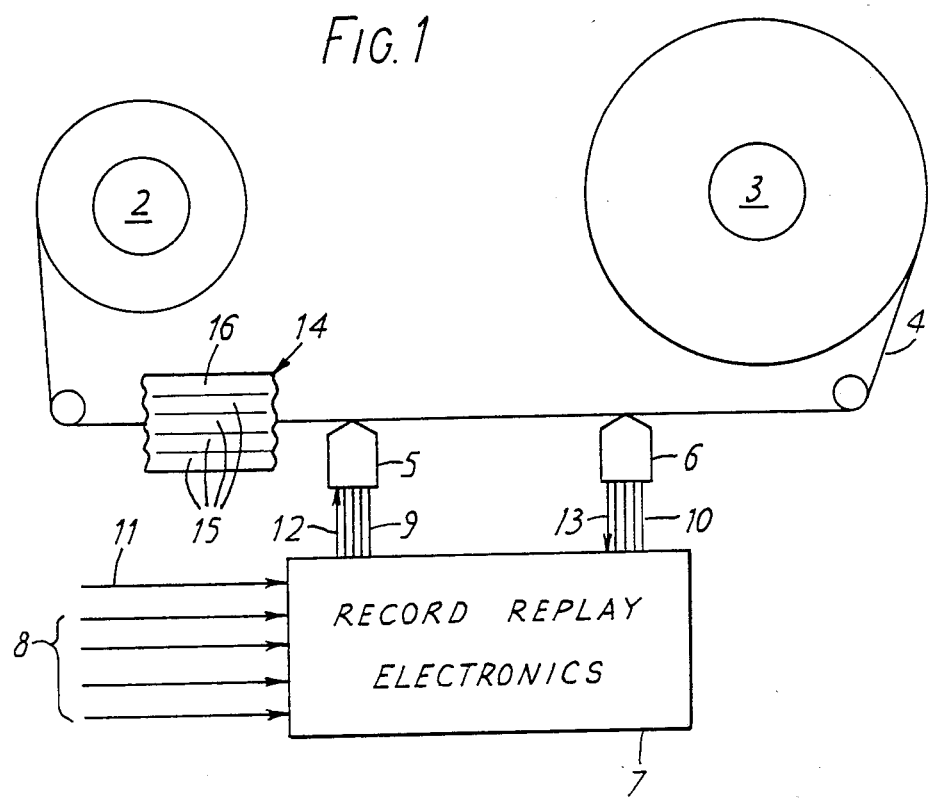
FIG. 1 shows an apparatus for recording of digital data.

FIG. 1 shows an example of an apparatus for recording of digital data. Such an apparatus may consist of a digital tape recorder, a magnetic disc recorder, an optical recorder or other device for recording and replaying of digital data. The illustrated apparatus is a digital tape recorder, comprising reels 2 and 3 carrying a tape 4 as a recording medium. Tape drive, tape motion controls, output electronics amplifiers are well known parts of such a digital tape recorder and are therefore not shown in FIG. 1. There is only shown a recording head 5, a replay head 6 and a recording and replay electronics 7, cooperating with the heads 5 and 6 as well as with input data channels 8 numbering four as an example only. The heads 5 and 6 are multichannel-heads connected to the electronics 7 by a plurality of lines 9 and 10.

An additional input channel 11 and additional lines 12 and 13 are provided for carrying additional data relating to data transmitted in the channel 8. A piece 14 of the tape 4 is shown twisted through $90_o$ to illustrate four audio tracks 15 for the four channels 8 and a dedicated track 16 for the channel 11.

Figure 2:
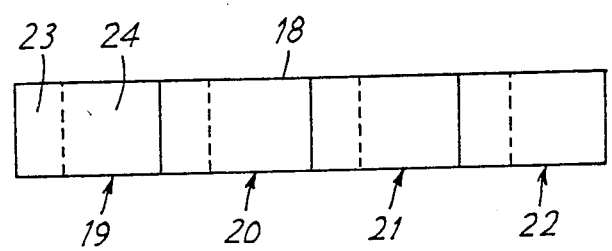
FIG. 2 shows a structure for auxiliary data.

FIG. 2 shows an example of a structure for the auxiliary data recorded on the dedicated track 16. A transmission block 18 of say 192 bits comprises four labels 19, 20, 21 and 22 of 48 bits each. Each label 19, 20, 21 and 22 of the block 18 is subdivided into an identification field 23 and a parameter field 24 of 16 and 32 bits respectively in one example.

Figure 3:
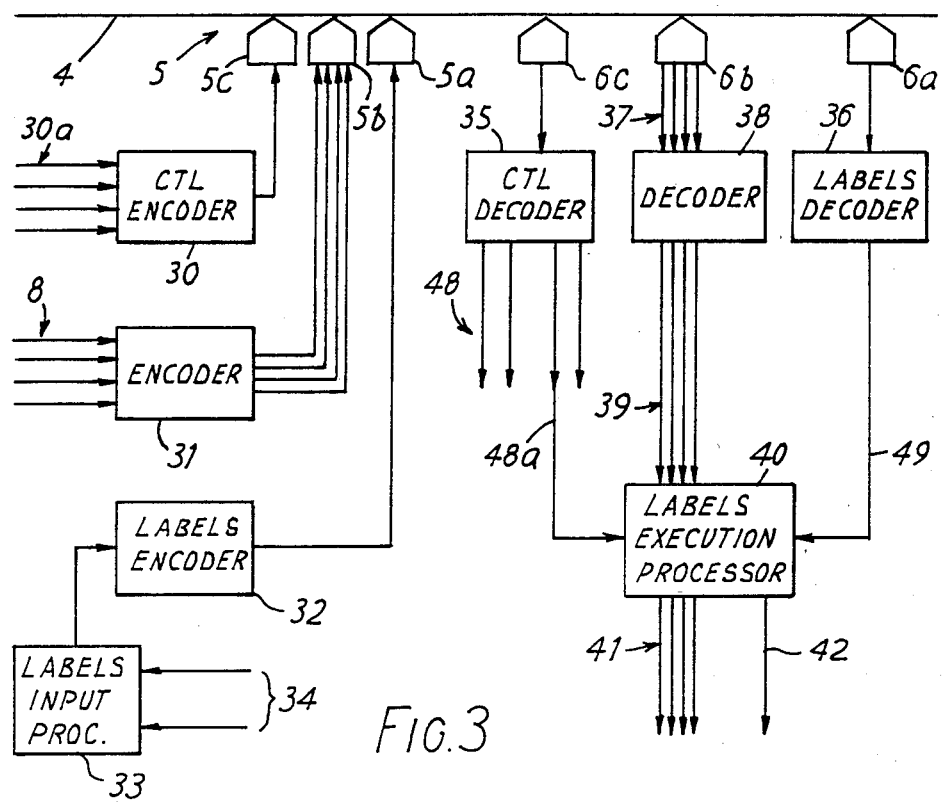
FIG. 3 shows an example of the record replay electronics of the apparatus in more detail.

A more detailed view of a part of the recording and replay electronics 7 is shown in FIG. 3. Record heads 5, separately indicated as 5a, 5b, 5c usually being part of a head stack, are connected to an optional CTL-encoder 30, an encoder 31 for data representing primary data, e.g. digital audio signals and an encoder 32 for auxiliary data respectively. The encoder 32 also referred to as labels encoder is preceded by an input processor 33 with inputs 34 from an interface, a keyboard or some other means for manual or automatic data entry. Connected to the encoder 312 are input data channels 8 carrying already digitized audio information. The above mentioned optional CTL-encoder is designed for encoding information inputted through lines 30a and of a type and at a rate as described in GB No. 2 080 997 but may not be necessary for the operation of the record and replay electronics 7, depending on the particular type of implementation chosen. In some cases, it can be for example supplemented by a simple Time Code encoder as used in state-of-the-art audio recorders. The same is true for a CTL-decoder 35 shown and connected to a replay head 6c which may be part of the head or head stack 6 together with replay heads 6a and 6b. Head 6a is connected to a decoder 36 also called labels decoder and designed for decoding auxiliary data like labels. The replay head 6b is connected through one or more lines 37 to a decoder 38 and the decoder 38 itself is connected through lines 39 to an execution processor 40. CTL-data and labels or auxiliary data are each recorded on their own separate tracks on the recording medium 4. The outputs of the optional CTL-decoder 35 (if implemented), or of the Time Code Generator which may replace it in some applications, can, if required, also be connected to the execution processor 40.

Figure 4:
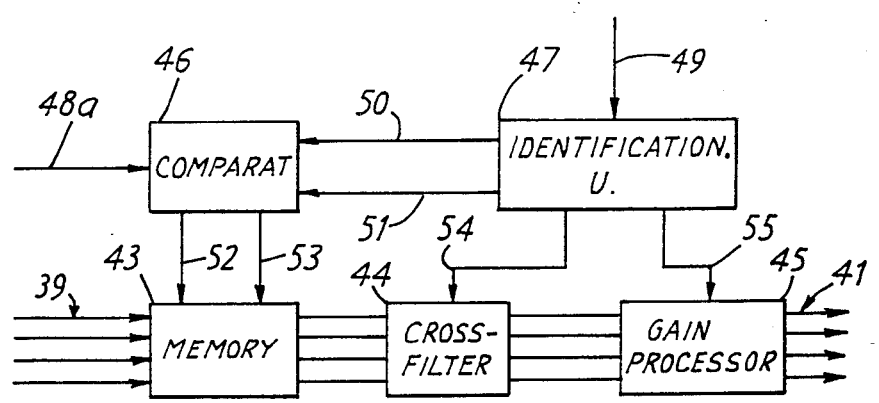
FIG. 4 shows a labels execution processor of FIG. 3 in more detail.

An example of a possible structure of the execution processor 40 is shown in FIG. 4. This structure is especially designed for the execution of a crossfade or crossfiltering operation. Such an operation may further be combined with an editing operation. A memory 43, a crossfiltering or crossfade unit 44 and a gain processor 45 are the means permitting specific instructions to be executed upon the digital data input through lines 39. A comparator and read/write control unit 46 is connected to the memory 43 as well as to an identification unit 47.

Operation of the apparatus is as follows. The input data channels 8 carry audio signals, for example, which are digitized in conventional manner (by sampling and digital-to-analog conversion) in the record- and replay-electronics 7, fed to the lines 9 and recorded on the tracks 15 of the tape 4 by means of the recording head 5. Additional information accompanying the input data are input through the channel 11. Within the electronics 7 the additional information is formatted into a structure such as that of FIG. 2. When information or signals are entered into the record and replay electronics 7 through channels 8, related information or control instructions are input through one of the inputs 34 referred to as channel 11 in FIG. 1. This may happen manually through any well known entry device such as a keyboard, a computer, or other digital signal source connected to the inputs 34. The labels input processor 33 carries out the usual digitizing and formatting operations that belong to the state of the art and delivers auxiliary data or labels formatted as described later on. These labels are encoded in the encoder 32 like the digital signals which are encoded in the encoder 31. A different encoding operation takes place in the operational CTL-encoder 30 which receives parameters and other information called CTL-data and referring exclusively to the operation of the recorder. Therefore both the format and the actual information contents of the CTL-data is essentially different from that of the digital audio data in channels 8 and from the auxiliary data. All these encoded data are then recorded on their respective tracks on the recording medium 4.

For replay operations primary data are read from the tape 4 by the head 6b and, transmitted through lines 37 to the decoder 38 where they are decoded according to well known decoding operations. Decoded data are transmitted through lines 39 to the execution processor 40. In the same manner the labels are read from the recording medium 4 by the replay head 6a and transmitted to the decoder 36 and then to the execution processor 40. According to information or control signals contained in the auxiliary data the primary data from lines 39 are possibly processed in the execution processor 40. Processed data leave this processor 40 through lines 41. Auxiliary output data are available on line 42 if required; they can serve for example for the monitoring of control instructions performed in the labels execution processor 40. Data from the CTL-track on the recording medium 4 are read by the head 6c and decoded in the optional CTL-decoded 35 or the optional Time Code decoder which may replace it. Outputs 48 thereof may represent synchronisation pulses, position of the recording medium, control of emphasis, format identification to be conveyed to the decoder 38 etc.

In an execution processor according to FIG. 4 decoded labels are transmitted through a line 49 to the identification unit 47. This unit is capable of a correct interpretation of the labels and of issuing corresponding control signals. E.g. in an editing operation the identification unit 47 outputs signals controlling write or read address generators by means of the comparison and read write control unit 46 which also receives information on the instantaneous position of the recording medium 4 from the CTL-decoder or Time Code decoder 35 via line 48a, as described in copending British patent application No. 8323111. Such signals are transmitted through lines 50, 51 and 52, 53. In this way digital signals transmitted to the memory 43 through lines 39 are not read out or not written in between edit points as described in the above mentioned application. Crossfade or crossfiltering parameters contained in the labels are transmitted to a crossfade or crossfiltering unit 44 through a line 54. In this unit 44 outputs of one or more channels are combined into a single signal in a well known manner. The gain processor 45 comprises a register for storing new gain instruction parameters, which can be updated whenever a relevant label specifies a new change in gain, a unit for changing the gain in an abrupt or stepwise way, and a digital multiplier which submits the digital primary signals to the desired gain changes. Updating of the gain values as well as start and stop of gain changes are controlled by means of signals outputted from the identification unit 47 through line 55.

The auxiliary data structure is preferably related to the structure in which digital data on the tracks 15 are recorded. The best mode of putting data corresponding to additional information into a structure or a format is to give them a bit rate and a structure or a format which matches the format used for the same data for transmission purposes. In this way, full transparency in recording, replay and transmission is obtained. If the apparatus has to cooperate with AES/EBU interfaces, this means that 1 bit of auxiliary data on track 16 corresponds to one sample of digital data on one of the tracks 15. This corresponds to 48 kb/s per track 15 or channel 8 if the sampling rate is selected as 48 kHz or 44.1 kb/s if the sampling rate is selected as 44.1 kHz.

Further it is convenience to put the auxiliary data into a format with a block structure commensurate with that of a transmission interface here not shown but already well known. Therefore each block 18 is subdivided into four words or labels 19, 20, 21, 22. To ensure a uniquely defined relationship between the signals being recorded on the tracks 15 and the auxiliary data being recorded on track 16, a precise relationship between data on those two different tracks is to be maintained. Therefore the electronics 7 has to control the output through lines 9 and 12 in a strict interdependence. The electronics 7 will treat the auxiliary data according to the usual and well known error detection and correction methods.

One dedicated track 16 preferably carries information relating to more than one track 15 for digital data. In this case well known multiplexing techniques are used to accommodate the auxiliary data for all the tracks 15 on the single track 16.

The formatting procedure taking place in the electronics 7 is further designed to subdivide the labels 19, 20, 21, 22 into an identification field 23 and a parameter field 24. The parameter field 24 carries numerical or alphanumerical information, while the identification field 23 carries information identifying the instruction, which may make use of the information contained in the parameter field 24. For example, a label might carry the meaning of increasing playback gain by an amount of 3 dB. The instruction to increase playback gain is located in the identification field 23, whereas the information containing the amount by which the gain is to be increased is located in the parameter field 24. A number of classes of applications or instructions can also be defined. For this purpose a part of the identification field 23 may be designated to contain a code with which the different classes can be identified.

Each class covers a well defined field of applications, such as recording, post-production, broadcast or compact-disc mastering, thus permitting the uses of that class to allocation the labelling capacity appropriately.

A further part of the identification field 23 has to contain information about the security level of the labels 19, 20, 21, 22. The labels may not all have the same importance to the data recorded on tracks 15. Therefore important labels have to be repeated several times to ensure that the instruction they carry will be executed. This is because of the possibility of recording and replay errors, in particular when dealing with damaged, spliced or dusty tapes or imperfect recording media in general.

The identifiction field 23 also has to accommodate countdown information relating to specific position on the tape 4 too. This count-down information enables e.g. a specified number of labels, all pointing to the same position on the tape 4 and all of them carrying the same instructions and parameters, to be correctly received in the correct sequence before execution is permitted. In this way it is ensured that the right action takes place at the right position on the tape 4. As an example the increase of playback gain starting from a particular position on the tape 4 may be mentioned.

By their nature, it may be necessary to edit labels. Some labels will generally have low importance, so that it will not matter if they are moved from one location to another on the tape, or are even suppressed altogether. Important labels, however, will not be allowed to be shifted or overwritten by less important labels. A simple way of ensuring this is to use part of the identification field to carry priority information, low priority labels not being permitted to either move or overwrite labels of higher priority.

When overwriting labels, dust particles may interface with the overwriting process, so that previously recorded labels will appear rather than the desired new labels. If the previously recorded, (and not overwritten), label appears with error detection information which does not indicate any error, possible misinterpretation of the labels might ensure. A solution to this is to record additional information such as an overwrite number into the identification field.

When formatting the labels 19, 20, 21, 22 for recording, within the electronics 7, several techniques may be applied to the auxiliary data in order to ensure correct recording and replay as well as error detection and correction. These techniques can be the same known techniques as are applied to the digital data recorded on tracks 15; they are not therefore explained in detail, because they are well known to specialists in this matter.

Briefly, however, these techniques include:

(1) The use of a modulation code such as 3PM, HD-1 which guarantees simple retrieval of the label information in digital recording. See "Channel Coding for Digital Audio Recording" T. Doi, AES Journal, Vol 31, No 4, April 1983, pp 224–238.

(2) The use of a code-violating preamble for purposes of synchronisation.

(3) The use of interleaved subwords of each individual label, each label being split into an integral number of subwords.

(4) The use of error detection and correction data.

(5) The use of a block format covering either a length of data equivalent to one label or several labels (although the content of the data covered may differ from that of one or several individual labels, due to the use of interleaved label subwords).

(6) The repetition of labels for increased safety, with a distance between repeated labels selected for adequate additional protection against dropouts on the tape.

The use of labels 19, 20, 21, 22 as defined and explained extends to a very large variety of applications. For example telephony speech may provide information which is to be added to digital data as auxiliary data and therefore has to be directed to the dedicated track 16 on recording. The ADPCM format in which such information is provided carries data at a speed of 32 kb/s. As the proposed label structure for auxiliary information carries data at a speed up to 48 kb/s, the data transmitted by telephony speech are easily formatted by the electronics 7.

In digital audio there is often information relates to the operational aspects of the generation of digital audio programmes which should be associated with the programmes. With labels this is easily achievable, since it will always be possible to put this information into an already existing labels-class or to define a new one.

Compact disc subcoding requires a total bit rate of 58.8 kb/s. This corresponds exactly to the transmission rate of the parameter field of the labels of two channels operating at 44.1 kHz. A two channel-recorder operating at 44.1 kHz can therefore carry all subcoding information, in a real-time-editable form on its label tracks or dedicated tracks 16.

Also mixdown information can be written in the form of labels. Information relating to the legal property of a programme is also easy to put into the labels 19, 20, 21, 22.

Digital information may also be transmitted and recorded while coded by an encryption procedure. In these cases information related to the encryption may be carried by the labels.

Another possibility for the use of labels is where information relating to an instantaneous compression and expansion characteristic of the digital audio samples is to be controlled.

Another possibility for the use of labels is where information relating to block companding of the digital audio samples (as used for instance in the Nicam-3 system) is to be controlled.

Labels may also be used to control a variable or non-nominal tape speed or acceleration.

A specially well adapted structure for such a label is now defined.

Total label bit rate, as dictated by the AES/EBU format: 48,000 bits/second

Label rate: 1,000 words/second, each label having 48 bits

Structure of the label:
16 bit identification field, further structured as follows:
  4 bits for label class
  3 bits for security level/countdown
  1 bit for frame sync
  2 bits for priority
  6 bits for instruction
32 bits parameter field.

Recording of the label:
Formatting of the 48-bit label into a label word of 72 bits, structured into 9 8-bit symbols as follows:
  First symbol:
    6 bits of preamble violating the code used in recording
    2 bits of overwrite number
  Second symbol:
    The first 8 bits of the label
  Third to sixth symbols:
    The successive 8 bits of the label
  Seventh symbol:
    The last 8 bits of the label
  Eighth and ninth symbols:
    two 8-bit check words from a 6-8 Reed-Solomon code in GF (2**8) protecting the six symbols of a label. The individual symbols can be recorded with interleave and repetition for improved safety in recording and replay.

The NICAM-3 system is described in "The Use of a Programmed Computer to Compare the Performance of Digital Companding Systems" G W McNally & N Gilchrist, EBU Review, Dec. 1979, pp 280-291.

The individual labels can also be complemented by other auxiliary data as delivered by a digital input interface prior to being formatted for error protection. The individual 48-bit labels, possibly supplemented by other auxiliary data, can be divided into 8- or 16-bit symbols which can themselves be recorded with error protection thanks to techniques such as added redundancy interleave, check words etc. which are state of the art in digital recording today.

What is claimed is:

1. Apparatus for recording digital primary data corresponding to signals transmitted through one or more input data channels and recorded on one or more tracks on a recording medium, characterised by means responsive to auxiliary data attached to said primary data, said auxiliary data consisting of control instructions and information related to the said digital primary data, said means carrying out record/reading operations of said auxiliary data on at least one separate track on the recording medium and executing instructions acting upon said digital primary data and said means establishing a formatted structure for the auxiliary data related to the structure of the digital primary data corresponding to the signals.

2. Apparatus according to claim 1, characterised in that the data structure comprises a data block subdivided into a plurality of labels.

3. Apparatus according to claim 1, characterised by a data rate for the auxiliary data related to the data rate of users' data according to the corresponding AES/EBU transmission format.

4. Apparatus according to claim 2, characterised in that each label is subdivided into an identification field and a parameter field.

5. Apparatus according to claim 3, characterised in that the identification field is arranged for indicating classes of labels corresponding to different labels of applications.

6. Apparatus according to claim 4, characterised in that the identification field is arranged for indicating a label priority.

7. Apparatus according to claim 4, characterised in that the identification field is arranged for indicating a security level.

8. Apparatus according to claim 4, characterised in that the identification field is arranged for indicating a countdown corresponding to locations on the recording medium.

9. Apparatus according to claim 4, characterised in that the identification field is arranged for indicating individual instructions.

10. Apparatus according to claim 2, characterised in that the labels are formatted with a preamble, a modulation code and additional information for protection and error detection.

11. Apparatus according to claim 3, characterised in that the labels are subdivided into an integral number of subwords, which are interleaved on recording.

12. Apparatus according to claim 2, characterised in that at least some labels are repeated on the dedicated track for increased safety.

13. Apparatus according to claim 2, characterised in that the labels are sequentially arranged and formatted with preamble, overwrite detection, error detection, correction information and interleaving of subwords.

14. Apparatus according to claim 1, characterised by a single dedicated track carrying auxiliary data for a plurality of tracks carrying digital data on the same recording medium.

15. Apparatus according to claim 1, characterised by a plurality of dedicated tracks carrying auxiliary data for all of the tracks carrying digital data on the same recording medium.

16. Apparatus according to claim 4, characterised in that the parameter field carries alphanumerical information only.

17. Apparatus according to claim 4, characterised in that the parameter field carries information related to operational aspects of the generation of digital audio programmes.

18. Apparatus according to claim 4, characterised in that the parameter field carries compact disk subcoding information.

19. Apparatus according to claim 4, characterised in that the parameter field carries mixdown information.

20. Apparatus according to claim 4, characterised in that the parameter field carries information relating to legal property of the accompanying programme.

21. Apparatus according to claim 4, characterised in that the parameter field carries information relates to encryption of the accompanying programme.

22. Apparatus according to claim 4, characterised in that the parameter field carries information relating to compression or expansion of digital audio samples.

23. Apparatus according to claim 4, characterised in that the parameter field carries information relative to specific positions on the recording medium.

24. Apparatus according to claim 4, characterised in that the parameter field carries information specifying tape speed or acceleration.

25. Apparatus according to claim 4, characterised in that the labels contains 16 bits of identification field and 32 bits of parameter field.

26. Apparatus according to claim 25, characterised in that the identification field is divided into 4 bits for labels class, 3 bits for security level/countdown, 1 bit for frame synchronisation, 2 bits for priority and 6 bits for instruction.

27. Apparatus according to claim 1, characterised in that said means comprise an input processor, encoder/decoder means and an execution processor for said auxiliary data.

28. Apparatus according to claim 27, characterised in that said execution processor comprises an identification unit for said auxiliary data and means designed for execution of specific instructions relating to the said digital primary data.

29. Apparatus according to claim 1, characterised by means executing selectable instructions acting upon selected parts of said digital primary data.

* * * * *